United States Patent
Hsu

[19]

[11] Patent Number: 5,939,644

[45] Date of Patent: *Aug. 17, 1999

[54] LIGHT INDUCTION FLOWMETER

[76] Inventor: Chao Fou Hsu, 109, Lane 316, Dah Shuenn 3th Rd., Kaohsiung, Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,580

[22] Filed: Dec. 31, 1996

Related U.S. Application Data

[63] Continuation-in-part of application No. 08/615,522, Mar. 11, 1996, abandoned.

[51] Int. Cl.$^6$ .................. G01F 1/05; G01F 15/00
[52] U.S. Cl. ...................... 73/861.79; 73/861.77
[58] Field of Search .................. 73/861.79, 861.77, 73/861.86, 195

[56] References Cited

U.S. PATENT DOCUMENTS

| | | | |
|---|---|---|---|
| 3,329,021 | 7/1967 | Quesinberry et al. | 73/861.79 |
| 3,729,996 | 5/1973 | Metz | 73/861.77 |
| 3,772,916 | 11/1973 | Booth et al. | 73/861.77 |
| 3,873,814 | 3/1975 | Mirdadian | 73/861.77 |
| 4,140,013 | 2/1979 | Hunger | 73/861.77 |
| 4,195,522 | 4/1980 | Anderson et al. | 73/861.79 |
| 4,308,755 | 1/1982 | Millar et al. | 73/861.79 |
| 4,489,600 | 12/1984 | Han | 73/861.79 |
| 5,622,618 | 4/1997 | Brane et al. | 73/861.79 |

*Primary Examiner*—Harshad Patel
*Attorney, Agent, or Firm*—David and Raymond; Raymond Y. Chan

[57] ABSTRACT

A light induction flowmeter for a water purification system such as reverse osmosis in water vending machines includes a flowing device and a light induction unit. The flowing device has a propeller wheel which is driven to rotate by a flow of water and has a magnetic element. The light induction unit has an infrared beam emitting member, an infrared beam detector and a magnetic induction rotator. The magnetic induction rotator is driven by the rotating magnetic element of the propeller wheel to rotate and thus its rotation is in synchronization with the rotating movement of the propeller wheel of the flowing device. When the magnetic rotator rotates, it intermittently blocks off the path of the infrared beam emitted continuously by the infrared beam emitting member and the infrared beam detector receives intermittent infrared light The frequency of reception of such intermittent infrared light by the infrared beam detector is proportional to the flow rate. The infrared beam detector converts the intermittent infrared light into electrical signals and transmits them to an external electronic counter which can therefore records the accumulative quantity of flowing water.

7 Claims, 10 Drawing Sheets

LIGHT INDUCTION FLOWMETER

FIELD OF THE PRESENT INVENTION

This application is a continuation-in-part of application Ser. No. 08/615,522, filed Mar. 11, 1996, now abandoned.

The present invention relates to flowmeter, and more particularly to a light induction flowmeter which is more accurate by means of infrared induction and is much smaller and easier to install than the mechanical type prior arts.

BACKGROUND OF THE PRESENT INVENTION

Nowadays, many fresh water supplies are polluted. Consumers usually obtain their drinking water from bottle water or water vending machines. Such water is usually purified by various kinds of purification equipment such as the reverse osmosis system. The most common filters nowadays are the reverse osmosis filter and ion exchange resin filter. Many households even have their own reverse osmosis or ion exchange resin units installed at home. However, all purification equipment must be efficiently maintained by replacing their filters after a certain period of time suggested by the manufactures.

Actually, the service life of filter depends on the quantity of water being purified. The more quantity of water flows through the filter, the quicker the filter loses its purifying ability. In fact, the filter of a purification equipment would be replaced while it is still normally functioned if the user maintains the purification equipment merely depending on its operating time. On the contrary, the filter of a purification equipment may lose its purifying function before the maintenance due date suggested by the manufacturer if a large quantity of water is purified within a short period of time. Thus, the user of the purification system may still has a great chance of drinking dirty and unsanitary water which is much dirtier than the tap water since the malfunctioned filter will become a breeding ground of bacteria and germ.

Accordingly, in order to maintain a purification equipment economically and effectively, the correct method of maintaining a purification system is to compute its quantity of purified water, i.e. the quantity of water flowing through the filter. After a certain quantity of water is purifying by the filters of a purification system, the filters may lose their purified ability and need to be replaced. A measuring device for recording the accumulative quantity of water that has passed through the purification system is therefore in demand to ensure a good purifying quality of the equipment.

A flowmeter of prior technology is made of mechanical coaxial sets of gears of different sizes that are moved by the water flow. Such mechanical device bears the disadvantages of inaccuracy due to the limitation of mechanical structure and the required large overall size of the device that makes it difficult to install on the purification system.

SUMMARY OF THE PRESENT INVENTION

A main object of the present invention is to provide a light induction flowmeter which can be incorporated with an electronic counter to provide an accurate record of the accumulative quantity of water which has passed through the purification system.

Another object of the present invention is to provide a light induction flowmeter which is superior to the conventional flowmeter because, first, the present invention is much more accurate by means of infrared induction instead of mechanical gears, and second, the present invention is much smaller and easier to install on the purification system than the conventional mechanical type.

Accordingly, the present invention provides a light induction flowmeter which comprises a flowing device and a light induction unit.

The flowing device has a water chamber and an induction chamber proximately formed therein, in which the water chamber has a water inlet and a water outlet to form a water flowing passage and the water chamber is isolated from the induction chamber to prevent the water flowing inside the water chamber from entering the induction chamber.

The flowing device further comprises a propeller wheel, which is disposed in the water chamber in rotatable manner, having a magnetic element mounted thereon.

The light induction unit comprises an induction rotator disposed coaxially with the propeller wheel and inside the induction chamber of the flowing device in rotatable manner.

The induction rotator has at least a transverse rotator through slot extending from one side to another side of the induction rotator, and a magnetic ring mounted on a bottom portion thereof. The magnetic ring is confronted with the magnetic element on the propeller wheel within the water chamber. A bottom side of the magnetic ring and a top side of the magnetic element are arranged with opposite magnetic poles to achieve magnetic induction. Thereby, the rotating propeller wheel which is driven by water flow through the water chamber induces the induction rotator to rotate simultaneously.

The light induction unit further comprises a light emitting element and a light receptor element mounted respectively on two opposite sides of the induction chamber, so that the rotator through slot of the induction rotator formed at a predetermined height can be aligned with the light emitting element and the light receptor element in such manner that the light beam emitted form the light emitting element can pass through the rotator through slot of the induction rotator and be received by the light receptor element per every rotation of the induction rotator.

DETAILED DESCRIPTION OF THE PREFERRED EMBODIMENTS

Figure 1:
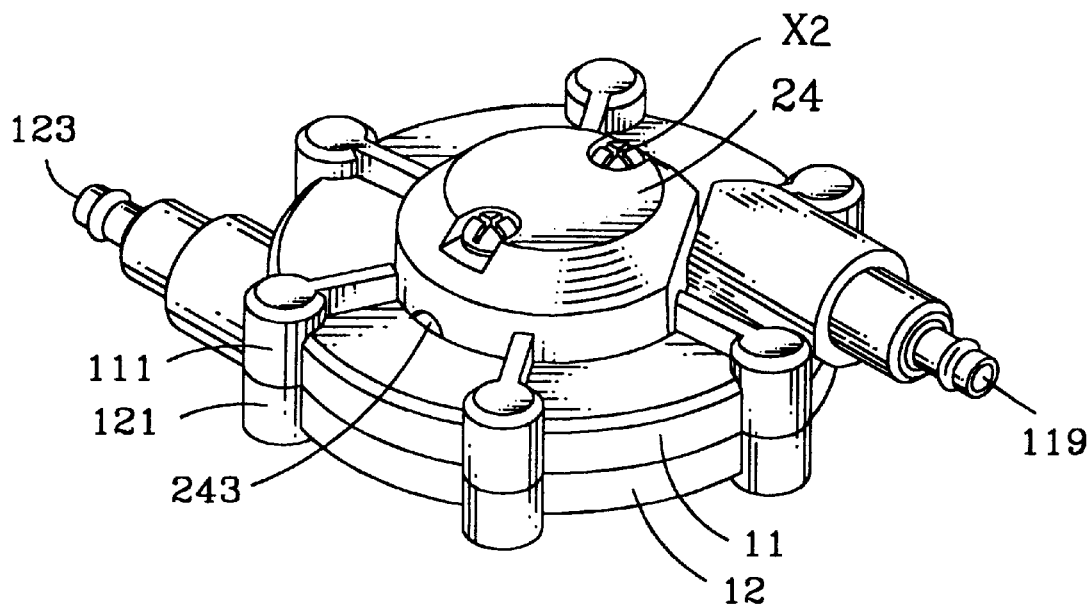
FIG. 1 is a perspective view of a light induction flowmeter according to a first preferred embodiment of the present invention.
Figure 3:
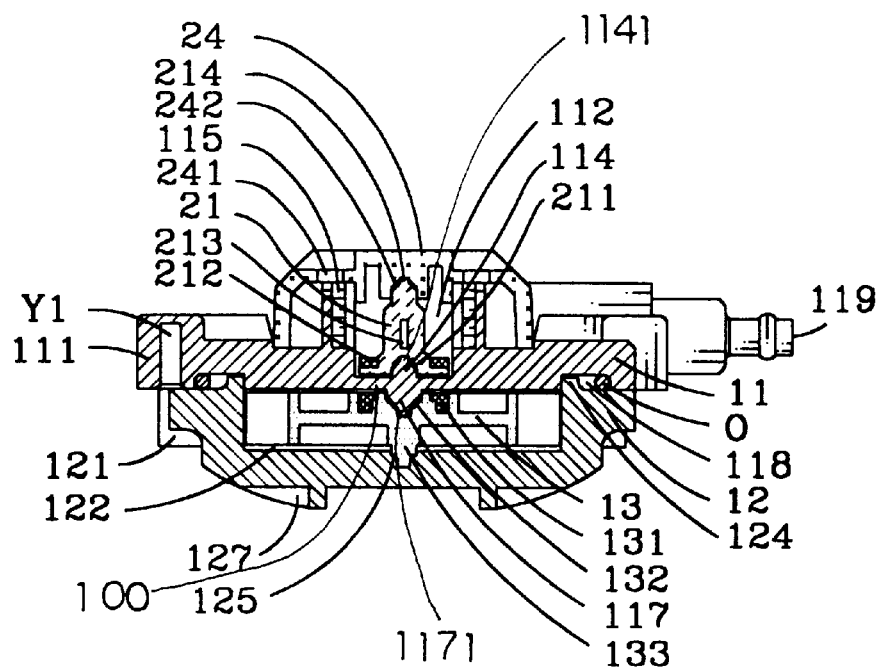
FIG. 3 is a sectional view of the above first preferred embodiment of the present invention.
Figure 2:
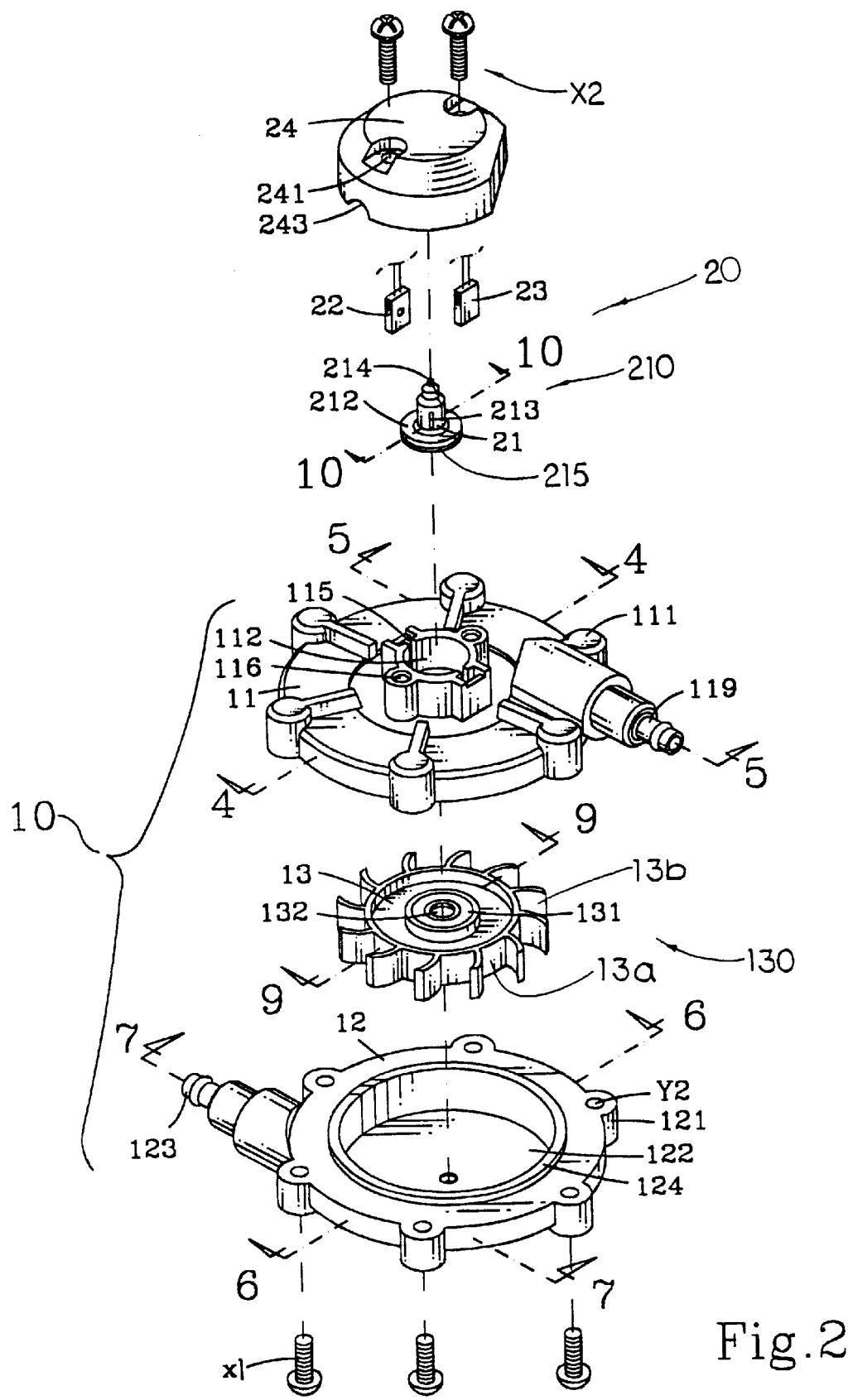
FIG. 2 is an exploded perspective view of the above first preferred embodiment of the present invention.

Referring to FIGS. 1, 2, and 3, a light induction flowmeter for a water purification system according to a first preferred embodiment of the present invention comprises a flowing device 10 and a light induction unit 20. The flowing device 10 comprises a cover member 11, a base seat 12 and a magnetic propeller wheel 130.

Figure 4:
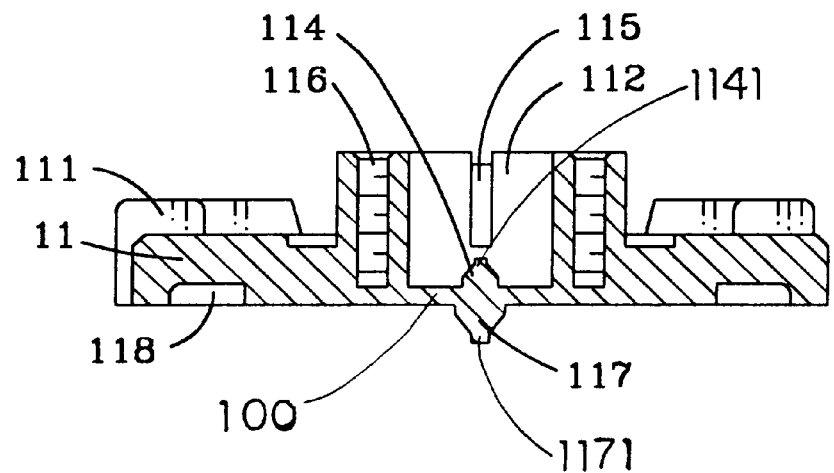
FIG. 4 is a sectional view of a cover member of the above first preferred embodiment of the present invention, along line 4—4 as indicated in FIG. 2.
Figure 5:
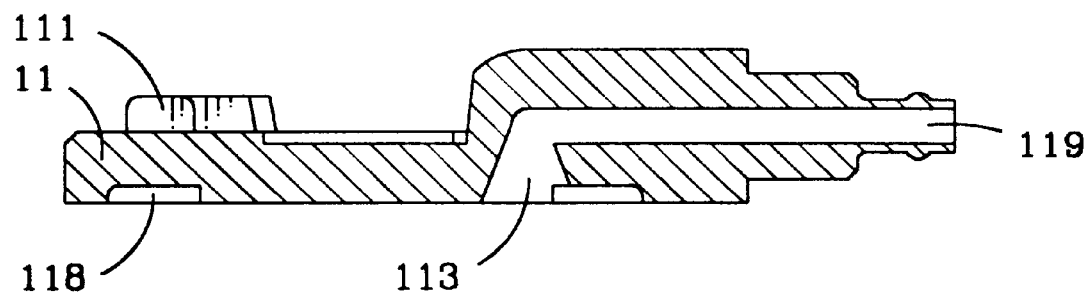
FIG. 5 is a sectional view of the cover member of the above first preferred embodiment of the present invention, along line 5—5 as indicated in FIG. 2.

Referring to FIGS. 2, 4 and 5, the cover member 11 has a plurality of ring appendices 111 on its periphery rim. Each ring appendix 111 has a threaded hole Y1 (as shown in FIG. 3). An induction chamber 112 is formed on a central portion of a top surface of the cover member 11. The cover member 11 has a water outlet 119 and an outlet channel 113 which has a top end connected to the water outlet 119 and is formed on a bottom surface of the cover member 11 (as shown in FIG. 5). A supporting axle 114 is upwardly protruded from a central area of a top side of the induction chamber 112. As shown in FIGS. 3 and 4, the supporting axle 114 is a conical body defining a sharp supporting tip 1141. A pair of confronting T-shaped grooves 115 and a pair of screw holes 116 are formed on a periphery wall of the induction chamber 112 respectively (as shown in FIG. 2). A rotation axle 117 is downwardly protruded from a central area of a bottom side of the cover member 11. As shown in FIGS. 3 and 4, the rotation axle 117 is a conical body defining a sharp rotation tip 1171. The supporting axle 114 and the rotation axle 117 are coaxially disposed on and under a thin central isolation wall 100 respectively, as shown in FIGS. 3 and 4. The cover member 11 has a ring groove 118 formed near a periphery rim on the bottom side of the cover member 11, as shown in FIGS. 3 and 5.

Figure 6:
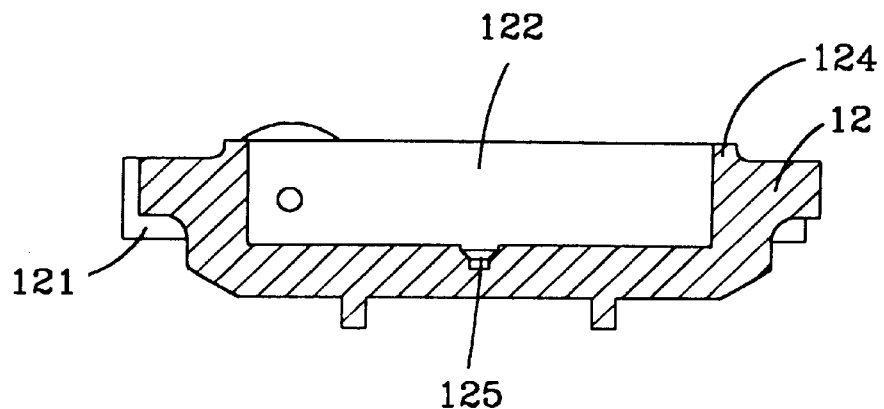
FIG. 6 is a sectional view of a base seat of the above first preferred embodiment of the present invention, along line 6—6 as indicated in FIG. 2.
Figure 7:
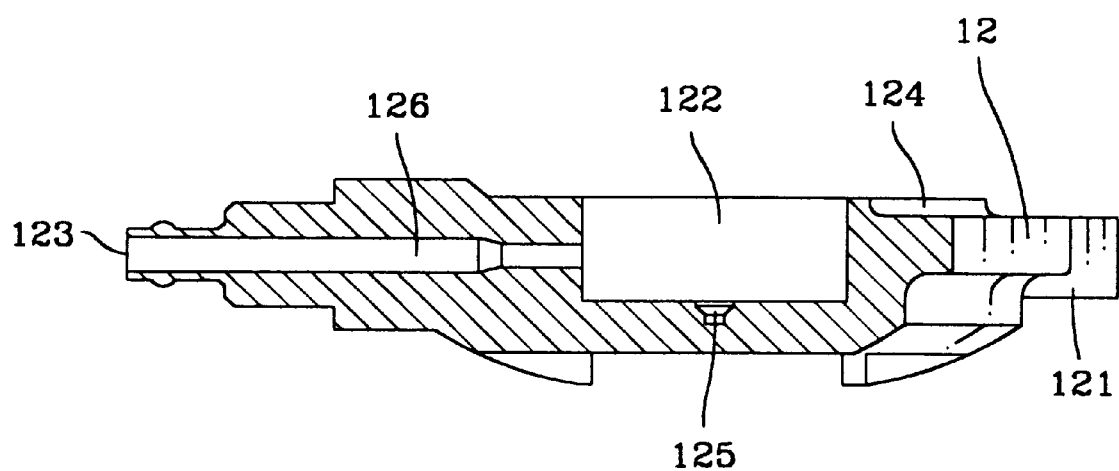
FIG. 7 is a sectional view of the base seat of the above first preferred embodiment of the present invention, along line 7—7 as indicated in FIG. 2.

Referring to FIGS. 1 to 3, the base seat 12 is tightly affixed on the bottom side of the cover member 11 with the bottom surface of the cover member 11 abutting to a top surface of the base seat 12. Referring to FIGS. 2, 6, and 7, the base seat 12 has a plurality of fastening provided screw housings 121 on its periphery rim. Each fastening screw housing 121 has a threaded hole Y2 for a screw X1 to connect the cover member 11 by penetrating the corresponding threaded hole Y1 of the ring appendix 111 of the cover member 11 (as shown in FIG. 2). The top surface of the base seat 12 forms an indented water chamber 122. The base seat 12 has a water inlet 123 and an inlet channel 126 formed between the water inlet 123 and the water chamber 122, as shown in FIG. 7. A bottom end of the outlet channel 113 is linked to the water chamber 122, so that the water inlet 123, the inlet channel 126, the water chamber 122, the outlet channel 113, and the water outlet 119 define a water flowing passage. As shown in FIG. 2, the base seat 12 has a ring guard 124 upwardly protruded from the top surface thereof A ring seal O is placed around the outside wall of the ring guard 124 of the base seat 12 and within the ring groove 118 of the cover member 11, as shown in FIG. 3. Thus, the water chamber 122 and the induction chamber 112 are sealed and isolated. A bottom surface of the water chamber 122 has an axial indention 125 which is formed coaxially with the rotation axle 117.

Figure 8:
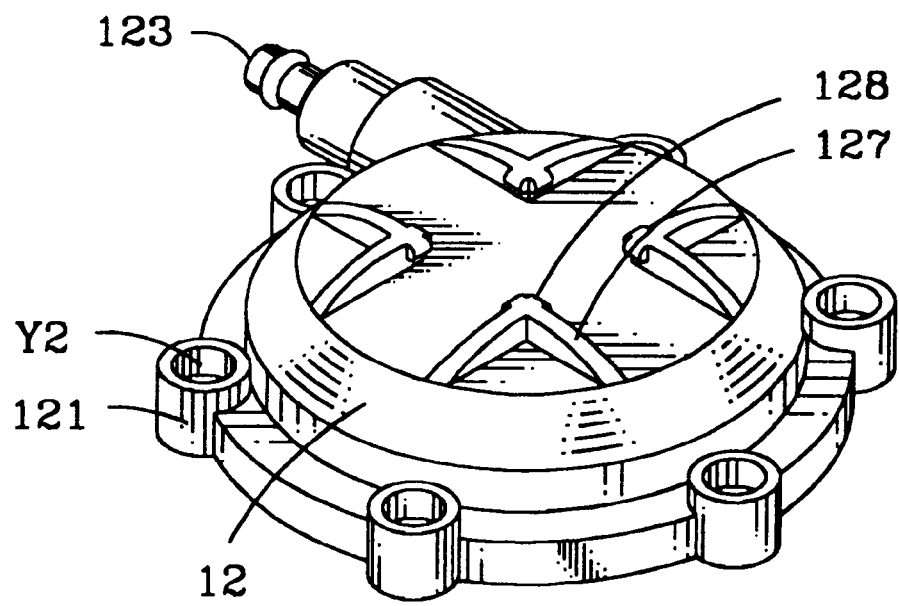
FIG. 8 is a perspective view of the base seat of the above first preferred embodiment of the present invention.

Referring to FIG. 8, A bottom surface of the base seat 12 has a predetermined number of L-shaped positioning ribs 127. Each of the two sides of each positioning rib 127 is parallel to a side of a neighboring positioning rib 127. At the corner of each positioning rib 127 has a protrusion 128 protruding toward a center of the base seat 12. A predetermined distance is defined between the protrusion 128 and the bottom surface of the base seat 12.

Figure 9:
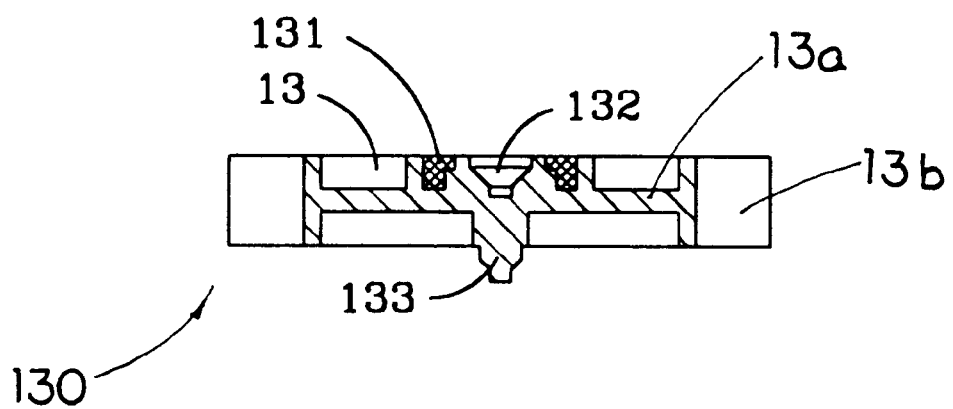
FIG. 9 is a sectional view of a propeller wheel of the above first preferred embodiment of the present invention along line 9—9 as indicated in FIG. 2.

Referring to FIGS. 2, 3 and 9, the magnetic propeller wheel 130 comprises a propeller wheel 13 which is a circular body 13a. A plurality of curved propeller blades 13b are extended radically from the circular body 13a and a ring-shaped magnetic element 131 is coaxially embedded on a top side of the propeller wheel 13. Referring to FIGS. 3 and 9, a central axial recess 132 and a propeller axle 133 are coaxially indented at a center of a top side of propeller wheel 13 and protruded downwardly from a center of a bottom side of the propeller wheel 13 respectively. The propeller wheel 13 is situated and supported in the water chamber 122 of the base seat 12 in rotatable manner that, the rotation axle 117 of the cover member 11 is fitted into the central axial recess 132 and the propeller axle 133 is fitted into the axial indention 125 located in the center of the water chamber 122 of the base seat 12, as shown in FIG. 3. Since the contact area between the axial recess 132 and rotation axle and the contact area between the propeller axle 133 of the propeller wheel 13 and the axial indention 125 are limited to their contacting points only, the friction therebetween is minimized to facilitate a rotation motion of the propeller wheel 13.

Referring to FIG. 2, the light induction unit 20 comprises a magnetic induction rotator 210, a light emitting element 22, a light receptor element 23, and a top lid 24.

Figure 10:
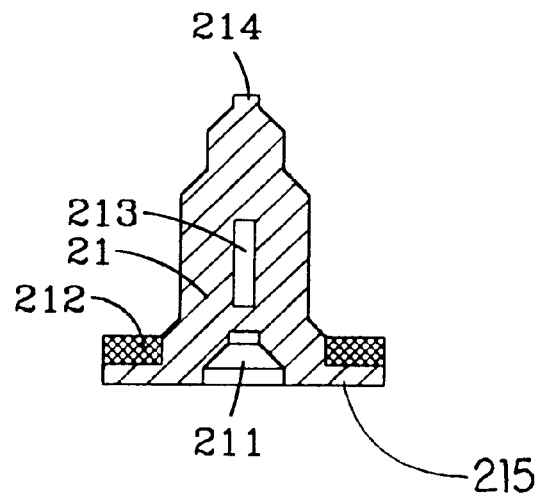
FIG. 10 is a sectional view of an induction rotator of the above first preferred embodiment of the present invention, along line 10—10 as indicated in FIG. 2.

Referring to FIGS. 2 and 3, the magnetic induction rotator 210 comprises an induction rotator 21 and a magnetic ring 212. The induction rotator 21 is a cylindrical body situated in the induction chamber 112 of the cover member 11 of the flowing device 10. A bottom portion of the induction rotator 21 forms an enlarged circular basal rim 215. Referring to FIGS. 2, 3 and 10, the induction rotator 21 has a conical axial rotating cavity 211 indented at a bottom end thereof for fitting onto the supporting axle 114 located at the top side of the induction chamber 112. Since the contact area between the induction rotator 21 and the supporting axle 114 is limited to the sharp supporting tip 1141 of the supporting axle 114, the friction therebetween is minimized. In such manner, the induction rotator 21 is capable of rotating along the supporting axle 114 while only a relative small induction rotating force is applied to the induction rotator 21.

The magnetic ring 212 is encased on top of the basal rim 215 in such manner that, the magnetic ring 212 is coaxially confronted with the ring-shaped magnetic element 131 embedded on the propeller wheel 13. Furthermore, a bottom side of the magnetic ring 212 and a top side of the ring-shaped magnetic element 131 are arranged with opposite magnetic poles to achieve magnetic induction. Thus, the rotation of the propeller wheel 13 driven by water flowing through the water chamber 122 may attract and induce the induction rotator 21 to rotate simultaneously. The induction rotator 21 has at least a transverse rotator through slot 213 extending from one side to another side of the induction rotator 21. A top end of the induction rotator 21 forms a circular tip 214.

Figure 11:
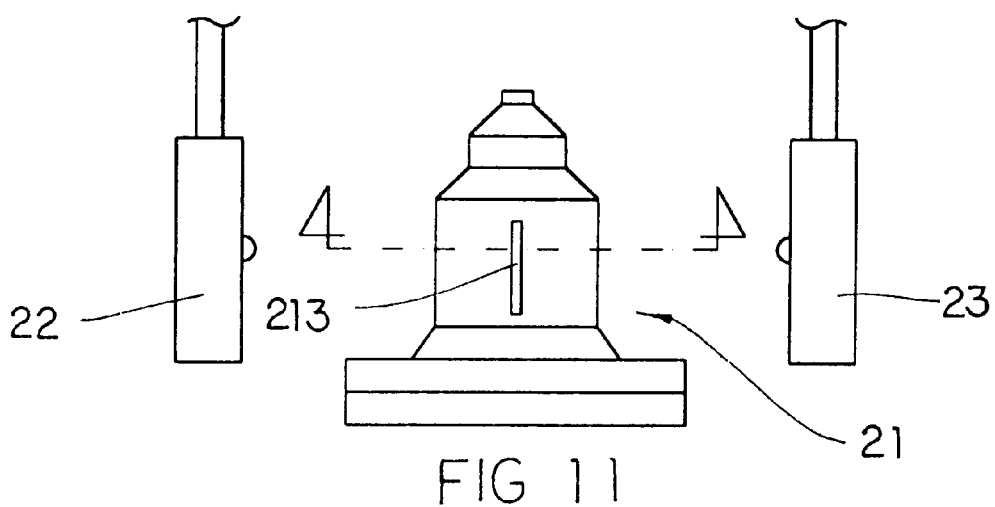
FIG. 11 is an elevation view of the rotator of the above first preferred embodiment of the present invention, illustrating the relationship between the rotator and a light emitting element and a light receptor element.

Referring to FIGS. 2 and 3, an infrared beam emitting member can be used as the light emitting element 22 and an infrared beam detector can be used as the light receptor element 23. The light emitting element 22 and the light receptor element 23 are respectively mounted in the corresponding opposite T-shaped grooves 115 on the periphery wall of the induction chamber 112 so that the rotator through slot 213 formed at a predetermined height can be aligned with the light emitting element 22 and the light receptor element 23. Accordingly, the infrared beam emitted from the light emitting element 22 can pass through the rotator through slot 213 and be received by the light receptor element 23 per every rotation of the induction rotator 21, as shown in FIG. 11.

The light receptor element 23 therefore receives two kinds of light sensor signal, having are light penetration and no light penetration. Such signals are transmitted to an usual external electronic counting circuit system (not shown). An accurate quantity of flow can be calculated according to the equation:

Quantity of Flow (Q)=Cross Sectional Area (A)×Flow Velocity (V)

Referring to FIGS. 1, 2 and 3, the top lid 24 has a pair of holes 241 on its top. Two screws X2 are respectively screwed through the holes 241 into the screw holes 116 of the induction chamber 112 for mounting the top lid 24 in position to cover the induction chamber 112 of the cover member 11. A bottom conical axial mounting recess 242 is formed, in a center of a bottom side of the top lid 24, coaxially with the supporting axle 114 of the cover member 11. The circular tip 214 of the induction rotator 21 is fitted into the bottom axial mounting recess 242 of the top lid 24. At least two wire grooves 243 are formed in appropriate positions in a rim of the top lid 24 for enabling electrical wires of the light emitting element 22 and the light receptor element 23 to pass through.

In accordance with an operating mode of the present invention, a water supply pipe is connected to the water inlet 123 of the base seat 12 and a water outlet pipe is connected to the water outlet 119 of the cover member 11. Water flow enters the water chamber 122 through the inlet channel 126, forcing the propeller wheel 13 to rotate, and flows out through the outlet channel 113 of the cover member 11. When the propeller wheel 13 rotates, the magnetic element 131 installed on top of the propeller wheel 13 attracts and induces the magnetic ring 212 of the induction rotator 21, so that the induction rotator 21 is driven to rotate simultaneously with the propeller wheel 13. Since the inductor rotator 21 has only one or more rotator through slot 213 presented in a middle part thereof, the continuous infrared beam emitted from the light emitting element 22 is blocked off intermittently by the induction rotator 21 during the inductor rotator 21 rotates.

The light receptor element 23 therefore converts each intermittent light into an electrical signal. Basically, the light receptor element 23 receives two kinds of light sensor signals, that are the light penetration and the no light penetration. Such signals are transmitted to an external electronic counting circuit system. An accurate quantity of flow can be calculated according to the equation:

Quantity of Flow (Q)=Cross Sectional Area (A)×Flow Velocity (V)

Figure 12:
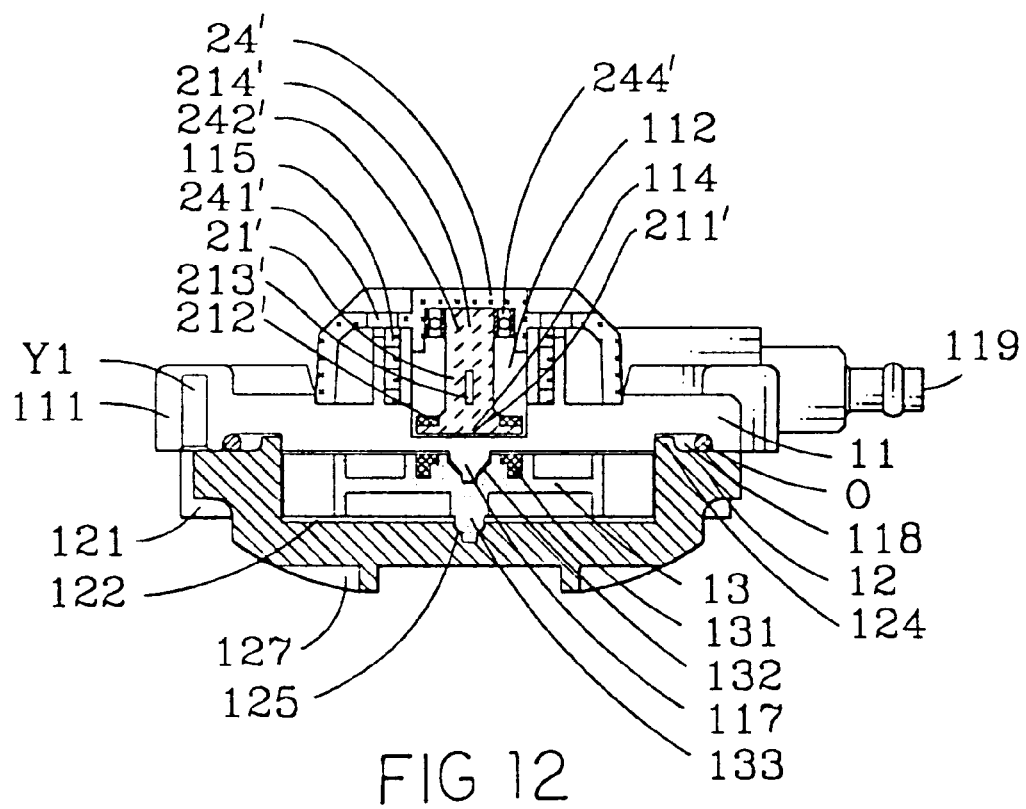
FIG. 12 is a sectional view of a light induction flowmeter according to a second preferred embodiment of the present invention.
Figure 13:
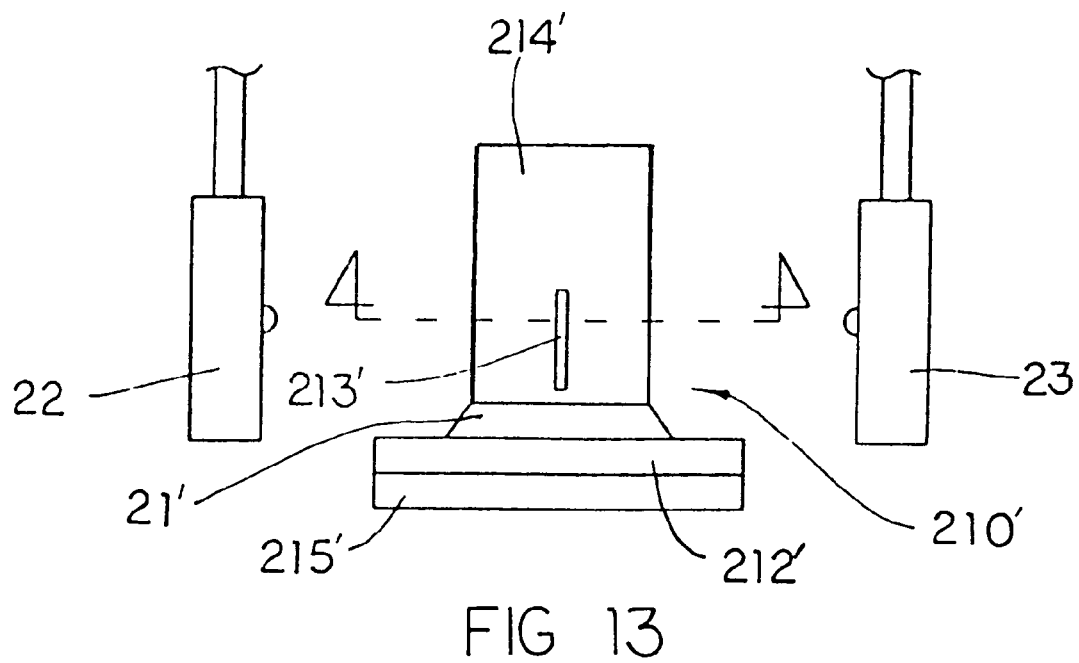
FIG. 13 is an elevation view of the rotator of the above second preferred embodiment of the present invention, illustrating the relationship between the rotator and a light emitting element and a light receptor element.

Referring to FIGS. 12 and 13, a light induction flowmeter according to a second preferred embodiment of the present invention is illustrated, in which the base seat 12 and the magnetic propeller wheel 130 has the same structure as in the above first preferred embodiment. The second embodiment is a modification made to the cover member 11, the top lid 24 and the magnetic induction rotator 210 of the light induction unit 20 of the above first embodiment.

In accordance with the second preferred embodiment, the cover member 11 of the second preferred embodiment has an identical structure of the above first embodiment except that the supporting axle 114 which is upwardly protruded from the central area of the topside of the induction chamber 112 of the cover member 11 as specified in the above first embodiment is eliminated. In other words, a flat top side is provided for the induction chamber 112, as shown in FIG. 12.

Referring to FIG. 12 and 13, the magnetic induction rotator 210' of the second preferred embodiment also comprises an induction rotator 21' and a magnetic ring 212'. The induction rotator 21' is a cylindrical body situated in the induction chamber 112 of the cover member 11 of the flowing device 10. A bottom portion of the induction rotator 21 ' also forms an enlarged circular basal rim 215'. The conical axial rotating cavity 211 indented at the bottom end of the induction rotator according to the above first embodiment is eliminated in the present second preferred embodiment. Moreover, the circular tip 214 of the top end of the induction rotator 21 as disclosed in the above first embodiment is simply modified to a top connecting end 214' in the present second preferred embodiment, as shown in FIGS. 12 and 13. The magnetic ring 212' is also encased on top of the basal rim 215'.

The top lid 24' of the present invention, which basically has the same configuration as that of the above first embodiment, also provides a pair of holes 241' on its top. The two screws X2 are respectively screwed through the holes 241' into the screw holes 116 of the induction chamber 112 for mounting the top lid 24' in position to cover the induction chamber 112 of the cover member 11. However, the bottom conical axial mounting recess 242 as disclosed in the above first embodiment is eliminated, and that at a center of a bottom side of the top lid 24' of the second embodiment, a bearing 244' is coaxially mounted thereon for rotatably engaging with the top connecting end 214' of the induction rotator 21', as shown in FIG. 12, so that the induction rotator 21' is rotatably supported by the top lid 24' and is coaxially aligned with the propeller wheel 13. Furthermore, a clearance should be defined between a bottom surface of the basal rim 215' of the induction rotator 21 ' and the flat bottom surface of the induction chamber 112.

Accordingly, the magnetic ring 212' is coaxially confronted with the ring-shaped magnetic element 131 embedded on the propeller wheel 13. Furthermore, the bottom side of the magnetic ring 212' and the top side of the ring-shaped magnetic element 131 are also arranged with opposite magnetic poles to achieve magnetic induction. Therefore, the rotation of the propeller wheel 13 driven by water flowing through the water chamber 122 may attract and induce the induction rotator 21' to rotate simultaneously. The induction rotator 21' also has at least a transverse rotator through slot 213' extending from one side to another side of the induction rotator 21'.

Figure 15:
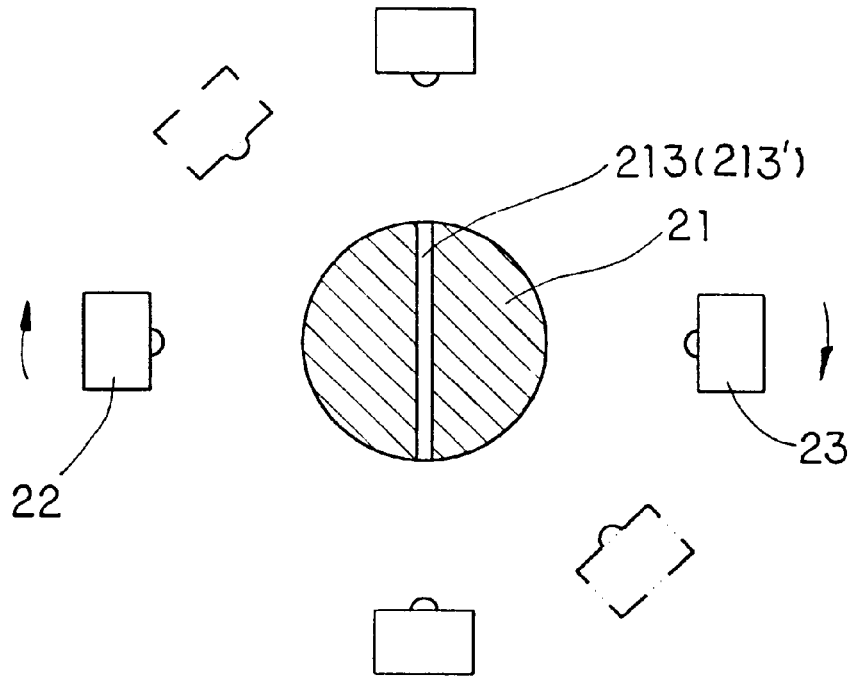
FIG. 15 is a sectional plan view of another alternative mode of the light induction unit of the present invention.

Referring to FIGS. 12 and 13, the light emitting element 22 and light receptor element 23 are also respectively mounted in the corresponding opposite T-shaped grooves 115 on the periphery wall of the induction chamber 112 so that the rotator through slot 213' formed at a predetermined height can be aligned with the light emitting element 22 and the light receptor element 23. Same as the above first preferred embodiment, the infrared beam emitted from the light emitting element 22 can pass through the rotator through slot 213' and be received by the light receptor element 23' per every rotation of the induction rotator 21', as shown in FIG. 15. Moreover, the light receptor element converts each intermittent light into an electrical signal. Such signals are transmitted to an external electronic counting circuit system. Same as the above mentioned first embodiment, an accurate quantity of flow for the second embodiment can also be calculated according to the equation:

Quantity of Flow (Q)=Cross Sectional Area (A)×Flow Velocity (V)

Figure 14:
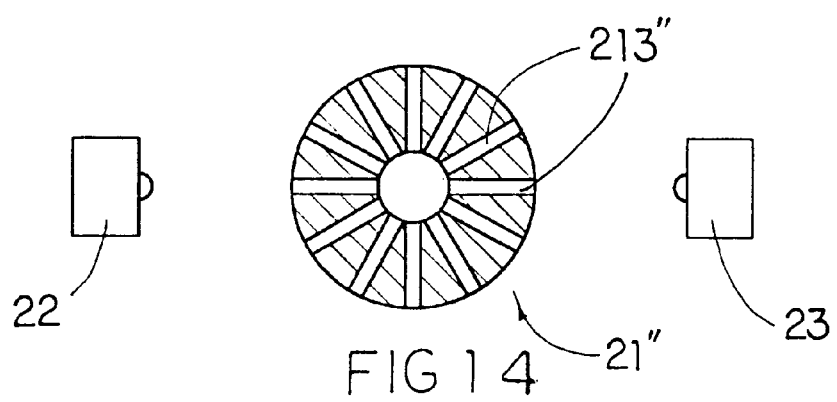
FIG. 14 is a sectional plan view of an alternative mode of the induction rotator positioned between the light emitting and light receptor elements.

According to both the above first and second embodiments, increasing in number of the rotator through slots 213 or 213' also increases the frequency of change of signals received by the light receptor element 23 per rotation of the propeller wheel 13 and, therefore, increases the precision in the calculation of the quantity of flow. Referring to FIG. 14, an alternative mode of the induction rotator 21" is illustrated, in which a plurality of rotator through slots 213" are provided. In this case, per each rotation of the induction rotator 21", the infrared beam emitted from the light emitting element 22 can be detected by the light receptor element 23 with a predetermined number of count, i.e. the number of the rotator through slots 213". It is worth to also disclose that, as shown in FIG. 15, another alternative mode of the light induction unit enables the light emitting element 22 and the light receptor element 23 to rotate and keeps the inductor rotator 21 or 21' in static position.

Figure 16:
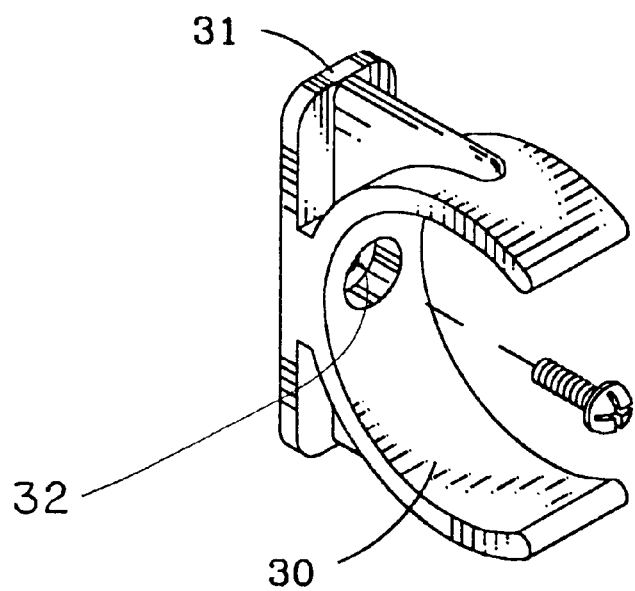
FIG. 16 is a perspective view of a holder of the above preferred embodiments of the present invention.

Referring to FIG. 16, the light induction flowmeter of the present invention farther comprises a holder 30 which is a C-shaped fixing clamp having a rectangular seat member 31 integrally connected to an outer side of the holder 30. The holder 30 further provides a screw hole 32 for screwing onto the flowing device 10.

Figure 17:
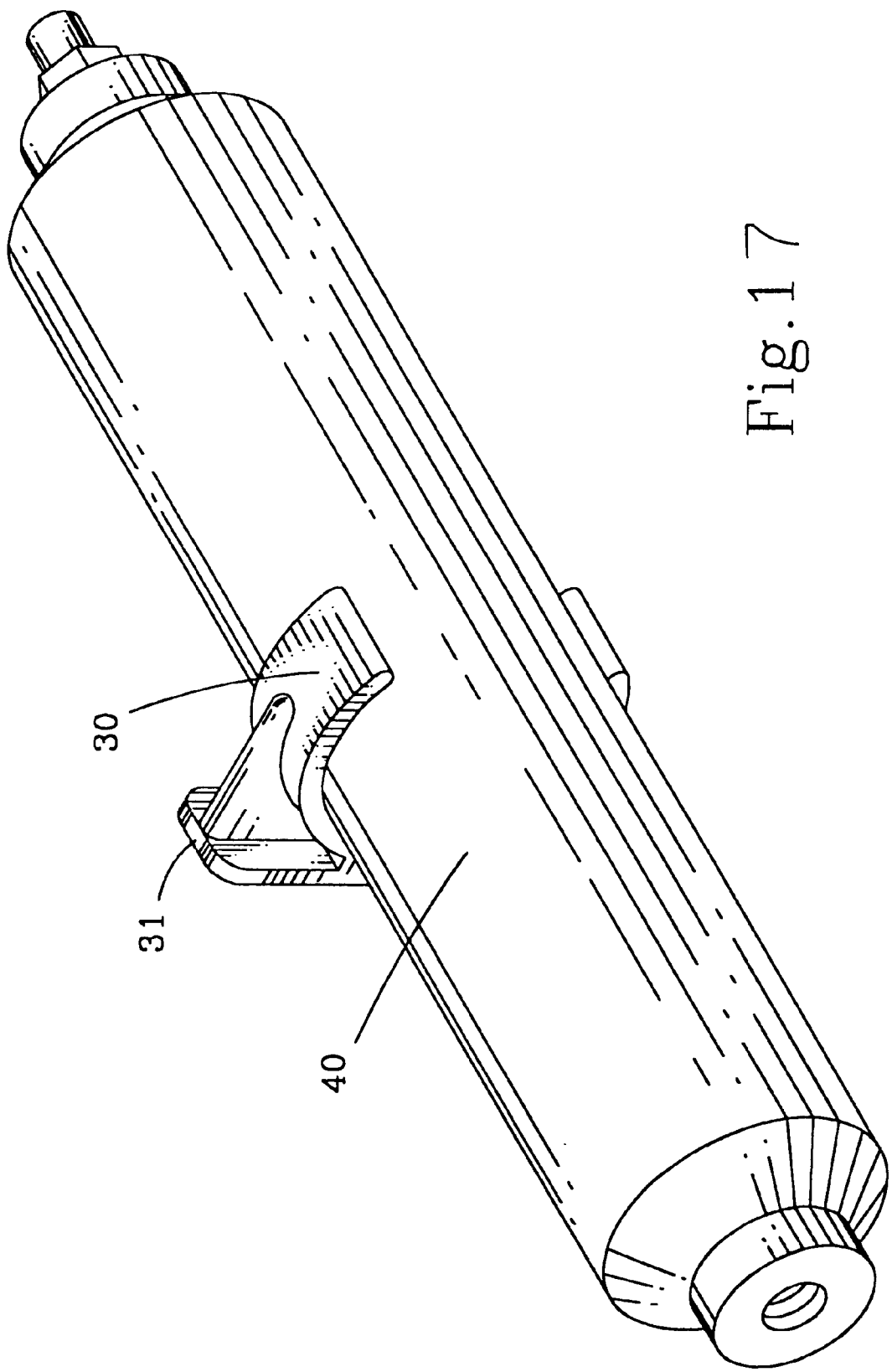
FIG. 17 is a perspective view of the holder placed on a purification element
Figure 18:
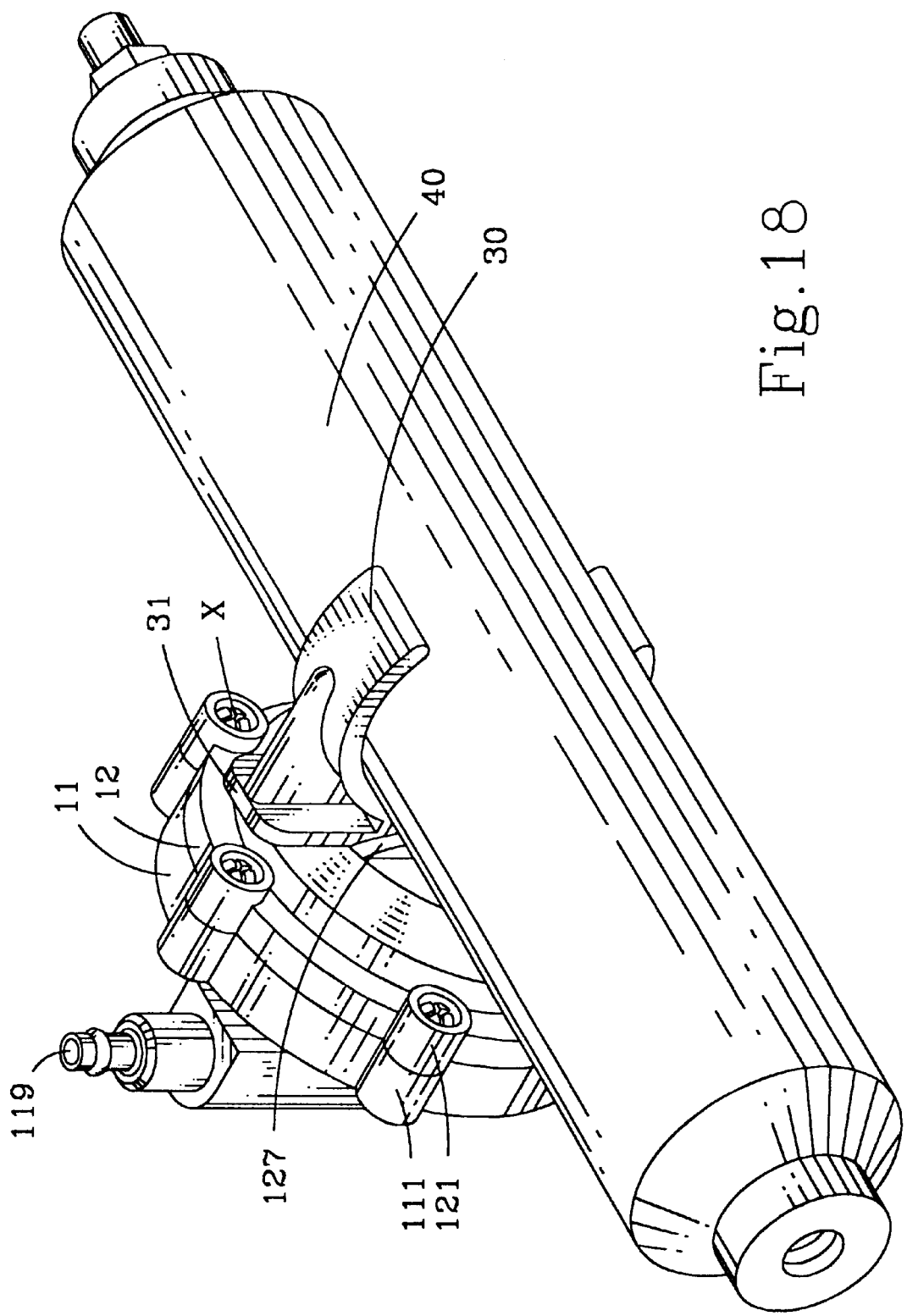
FIG. 18 is a perspective view illustrated the holder connecting the light induction flowmeter of the present invention to a purification element.

Furthermore, as mentioned above, the base seat 12 provides the predetermined number of the positioning ribs 127, as shown in FIG. 8, in which the distance between two parallel sides of any two positioning ribs 127 fits the width of the seat member 31 of the holder 30, as shown in FIG. 16. The holder 30 is usually mounted on an external surface of a purification element 40, as shown in FIG. 17. The distance between the protrusion 128 of the positioning rib 127 and the bottom of the base seat 12 fits the thickness of the seat member 31 of the holder 30 as shown in FIG. 18.

The purpose of such design is to facilitate the installation of a light induction flowmeter of the present invention onto the purification element 40 of a water purification system, as shown in FIG. 17, wherein water is arranged to flow through the light induction of flowmeter of the present invention before entering the purification element 40.

By replacing the traditional mechanical flow counter of the prior art technology by the present invention using light induction method, much more accurate record of the accumulative quantity of water flowing through the purification system can be obtained and the space required to house a flowmeter in a water purification system is reduced to half. The present invention therefore provides a more reliable method to determine the appropriate time to replace a purification element for optimizing the usage of a water purification system.

What is claimed is:

1. A light induction flowmeter, comprising a flowing device and a light induction unit, said flowing device comprising a cover member having a water outlet, an outlet channel connected to said water outlet and formed on a bottom surface of said cover member, an induction chamber surrounded by a peripheral wall and formed on a central portion of a top surface of said cover member, said cover member further providing a supporting axle protruding upwardly from a central area of a top side of said induction chamber, and a rotation axle protruding downwardly from a central area of a bottom side of said cover member, wherein said supporting axle is a conical body defining a sharp supporting tip and said rotation axle is a conical body defining a sharp rotation tip, and that said supporting axle and said rotation axle are respectively and coaxially disposed on and under a thin central isolation wall which is a bottom wall of said induction chamber, a pair of confronting grooves being formed on said peripheral wall of said induction chamber;

a base seat tightly affixed on said bottom side of said cover member with said bottom surface of said cover member abutting to a top surface of said base seat, said base seat having an indented water chamber formed on said top surface of said base seat, a water inlet and an inlet channel formed between said water inlet and said water chamber, wherein a bottom end of said outlet channel is linked to said water chamber, and thus said water inlet, said inlet channel, said water chamber, said outlet channel, and said water outlet define a water flowing passage, and that said water chamber and said induction chamber are sealed and isolated by said thin central isolation wall therebetween; and a magnetic propeller wheel comprising a circular body having a plurality of curved propeller blades extended radically therefrom, and a ring-shaped magnetic element coaxially embedded on a top side of said circular body, wherein a central axial recess is coaxially indented at a center of a top side of said circular body, said magnetic propeller wheel being situated and supported in said water chamber of said base seat in rotatable manner by fitting said rotation axle of said cover member into said central axial recess of said magnetic propeller wheel, wherein a friction formed between said magnetic propeller wheel and said rotation axle is minimized because a contact area between said magnetic propeller wheel and said rotation axle is limited to said sharp rotation tip of said rotation axle;

said light induction unit comprising a magnetic induction rotator disposed coaxially with said magnetic propeller wheel inside said induction chamber in a rotatable manner, said magnetic Induction rotator comprising a cylindrical body situated in said induction chamber of said cover member, a bottom of said induction rotator forming an enlarged circular basal rim, wherein a conical axial rotating cavity is indented at a bottom end of said induction rotator to fit onto said supporting axle in said induction chamber, wherein friction between said induction rotator and said supporting axle is minimized because a Contact area between said induction rotator and said supporting axle is limited to said sharp supporting tip of said supporting axle, so that said magnetic induction rotator is capable of rotating along said supporting axle while only a relative small induction rotating force is applied to said magnetic induction rotator, said magnetic induction rotator having at least a transverse rotator through slot extending from one side to another side of said induction rotator, a top end of said induction rotator forming a circular tip, and a magnetic ring which is encased on top of said basal rim is coaxially confronted with said ring-shaped magnetic element embedded on said propeller wheel, and that a bottom side of said magnetic ring and a top side of said ring-shaped magnetic element are arranged with opposite magnetic poles to achieve magnetic induction;

a light emitting element and a light receptor element are respectively mounted in said two opposite confronting grooves provided on said peripheral wall of said induction chamber, wherein said rotator through slot is aligned with said light emitting element and said light receptor element, and a top lid for mounting on said cover member to cover said induction chamber on said cover member, said top lid having a bottom conical axial mounting recess formed in a center of a bottom side of said top lid, wherein said bottom conical axial mounting recess is coaxially aligned with said supporting axle of said cover member, and that said circular tip of said induction rotator is fitted into said bottom axial mounting recess of said top lid;

wherein said light emitting element continuously emits a light beam which passes through said rotator through slot of said induction rotator and is received by said light receptor element per every rotation of said induction rotator, wherein when said magnetic induction rotator is driven by said rotating magnetic propeller wheel to rotate simultaneously, said rotating magnetic induction rotator intermittently blocks off said light beam emitted from said light emitting element and said light receptor element receives an intermittent light per each rotation of said magnetic induction rotator, wherein a frequency of reception of said intermittent light by said light receptor element is proportional to a water flow rate of said water flow inside said water chamber, and that said light receptor element converts each said intermittent light into an electrical signal.

2. A light induction flowmeter, as recited in claim 1, wherein a bottom surface of said water chamber forms an axial indention coaxially aligned with said rotation axle and a center of a bottom side of said propeller wheel protrudes a propeller axle for fitting into said axial indention so as to rotatably hold said magnetic propeller wheel in position.

3. A light induction flowmeter, as recited in claim 2, wherein said two confronting grooves are two T-shaped grooves.

4. A light induction flowmeter, as recited in claim 3, further comprising a ring seal placed between said cover member and said base seat, said water chamber having a ring guard upwardly protruded from said top surface of said base seat and said cover member having a ring groove indented around a periphery rim provided on said bottom surface of said cover member, said ring seal being placed around an outside wall of said ring guard of said base seat and positioned within said ring groove of said cover member.

5. A light induction flowmeter, as recited in claim 4, wherein said base seat has a predetermined number of L-shaped positioning ribs, each of two sides of each said positioning rib being parallel to a side of another said neighboring positioning rib, at a corner of each of said positioning ribs having a protrusion protruding toward a center of said base seat, wherein a predetermined distance is defined between each of said protrusions and said bottom surface of said base seat.

6. A light induction flowmeter, as recited in claim 5, wherein said light emitting element is an infrared beam emitting member and said light receptor element is an infrared beam detector.

7. A light induction flowmeter, as recited in claim 6, further comprising a holder fastened onto said flowing device for installing said light induction flowmeter on a purification element of a water purification system, wherein said holder is a C-shaped fixing clamp having a rectangular seat integrally connected to an outer side of said holder, wherein said holder is mounted on an external surface of said purification element of said water purification system, and that a distance between said protrusion of said positioning rib and the bottom of said base seat fits the thickness of said seat member of said holder.

* * * * *